UNITED STATES PATENT OFFICE.

OSCAR FALKE, OF NEW YORK, N. Y., AND EDWARD SIMON, OF WASHINGTON, NEW JERSEY.

IMPROVEMENT IN ARRANGEMENT OF METALLIC PLATES FOR VULCANIZING RUBBER AND OTHER GUMS.

Specification forming part of Letters Patent No. 33,523, dated October 22, 1861.

*To all whom it may concern:*

Be it known that we, OSCAR FALKE, of the city, county, and State of New York, and EDWARD SIMON, of Washington, in the county of Bergen and State of New Jersey, have invented a new and Improved Method of Manufacturing Hard Gutta-Percha and India-Rubber Compounds; and we do hereby declare that the following is a full and exact description thereof.

Before proceeding to describe fully our improved method of manufacturing hard gutta-percha or india-rubber compound it may be well briefly to advert to the different methods by which such compound is at present treated before and during its vulcanization.

After the pure rubber or gutta-percha is dried and mixed in the usual way, well known to manufacturers of such fabrics, it is then, by the use of heavy steam-heated calender-rollers, spread out into sheets either upon cloth or upon an iron steam-cylinder or steam-drum. It is then cut out into the required size or shape and either confined in tin or other metallic molds, or it is enveloped by sheets of iron, or roofing-tin, or brass, or other metal. Each gutta-percha or rubber sheet is in this way in contact with two metallic sheets. Then the article is subjected to the heating or curing process in the following manner: Several of these enveloped rubber sheets are laid one upon the other, and then screwed between two iron plates somewhat tightly, so as to cause the metallic plates to adhere to the gutta-percha or rubber during the heating process; or the sheet of india-rubber is covered with two sheets of pliable tin-foil, and then subjected to the curing process without further care and preparation.

It is a well-known fact that, in order to obtain a smooth surface upon the vulcanized india-rubber sheet, it is necessary that the covering metallic sheet shall have a surface of untarnished smoothness, and, inasmuch as the curing process affects the covering metal by oxidation, it follows that the furnishing of two metallic sheets for every single sheet of india-rubber or gutta-percha is very expensive. The fact is also well known to every manufacturer of hard-rubber compound that by screwing several sheets of india-rubber (each sheet of rubber in contact with two sheets of metal) together it is difficult always to give the right degree of pressure in screwing, which has a deteriorating effect during the vulcanizing process. It is also known that by covering gutta-percha or india-rubber with two flexible tin-foils and subjecting it then to heat without further care the violent action of the steam causes oftentimes blisters on the surface, especially when the temperature is high, as is often requisite in order to give a certain quality or hardness to the vulcanized article.

The object of our invention is to prevent any such blistering of the surface, thus giving a fine smooth finish, and at the same time lessening very materially the expense of vulcanization. By our improved method but one sheet of metal is used between two sheets of gum, instead of two sheets of metal, as in the ordinary way. This renders the pressure more uniform and insures a more perfect surface. By our improved method the india-rubber or gutta-percha, after being dried and mixed in the usual way, is spread out by means of steam-heated calender-rollers and then cut into sheets of any required size. We then place a sheet of the india-rubber or gutta-percha, while yet in its green and plastic state, upon a sheet of rolled metal, generally brass or tinned iron, cover it with another metallic sheet, and then place another sheet of the gum in its plastic state on the surface of the metallic plate, and so continue to alternate a plate of metal and sheet of gum in such way that every metallic plate serves for two sheets of gum, excepting the final sheet. Therefore four metallic plates are sufficient to envelop three sheets of rubber. Five sheets of gum require but six plates of metal, thus diminishing the expense of metal almost one-half. We make the india-rubber or gutta-percha adhere closely to the metallic plates either by loading it with the weight of iron plates or by passing over it with heavy hand-rollers or by passing the whole through calender-rollers. When two plates of metal are used in contact they do not press uniformly on the different parts of the surface of the sheets of rubber. Consequently blisters are liable to form where the pressure is less; but by our improved mode of using a single plate between two sheets of rubber the latter is always brought home upon the metallic surface, thus securing a more perfect finish, and hence an improved article.

We have stated that we generally employ rigid metal sheets—as brass or tinned iron—and we prefer so to do because we can best disengage the hardened rubber from the intervening metal plates when the latter have some rigidity and do not adhere so closely to the rubber, after its vulcanization, as tin-foil or tin-leaf; but we do not disclaim the use of tin-foil or tin-leaf when used in the way and manner described above. We do not, however, claim the use of tin-foil in the way and manner described in the patent of L. Otto P. Meyer, reissued August, 1859. We also disclaim the process of mixing and curing india-rubber and gutta-percha, as our invention relates to the above-described mode of arranging the rubber sheets alternately with plates of metal and then treating the same substantially as described.

We are aware that rubber belting has been wound upon a roller, with a sheet of flexible metal between the coils of rubber. Therefore we confine our claim to the above-described mode of arranging rubber and other gums for vulcanization.

Having thus fully described our invention, what we claim, and desire to secure by Letters Patent of the United States, is—

The above-described mode of arranging and treating india-rubber, gutta-percha, and other vulcanizable gums, substantially as described, for the purposes specified.

OSCAR FALKE.
EDWARD SIMON.

Witnesses:
P. N. LE GENDRE,
W. J. A. FULLER.